United States Patent [19]

Sato

[11] Patent Number: 5,373,554
[45] Date of Patent: Dec. 13, 1994

[54] TELEPHONE HAVING SEPARATE POWER CIRCUIT FOR SUPPLYING POWER TO SPEECH NETWORK

[75] Inventor: Tatsuya Sato, Nagoya, Japan

[73] Assignee: Brother Kogyo Kabushiki Kaisha, Nagoya, Japan

[21] Appl. No.: 72,394

[22] Filed: Jun. 7, 1993

[30] Foreign Application Priority Data

Jun. 11, 1992 [JP] Japan .................... 4-179212

[51] Int. Cl.$^5$ ............................................ H04M 19/00
[52] U.S. Cl. .................................. 379/387; 379/413; 379/348; 379/344
[58] Field of Search ............ 379/387, 413, 388, 389, 379/338, 344, 345, 348

[56] References Cited

U.S. PATENT DOCUMENTS

| | | | |
|---|---|---|---|
| 4,064,366 | 12/1977 | Whentley et al. | 379/387 |
| 4,272,650 | 6/1981 | Bolgiano et al. | 379/387 |
| 4,497,980 | 2/1985 | Gorman et al. | 379/387 |
| 4,647,787 | 3/1987 | Pommer, II | 379/387 |
| 4,951,002 | 8/1990 | Hanon | 379/387 |
| 4,961,220 | 10/1990 | Tentler et al. | 379/413 |
| 4,984,267 | 1/1991 | Mortinez | 379/413 |
| 5,136,630 | 8/1992 | Breneman et al. | 379/387 |

*Primary Examiner*—James L. Dwyer
*Assistant Examiner*—M. W. Shehata
*Attorney, Agent, or Firm*—Oliff & Berridge

[57] ABSTRACT

A telephone includes a speech network for transmitting an outgoing voice signal and receiving an incoming voice signal from a remote telephone. The speech network is not supplied with power from a telephone exchange through a telephone line but supplied with a separate power supply. To interrupt the power supply from the telephone exchange, a transformer is interposed between the speech network and the telephone line. A ringer circuit and a dialer circuit are connected to the primary side of the transformer. Because the power supplied to the speech network does not fluctuate, the circuit design of the speech network can be readily performed using inexpensive circuit components.

19 Claims, 3 Drawing Sheets

TELEPHONE HAVING SEPARATE POWER CIRCUIT FOR SUPPLYING POWER TO SPEECH NETWORK

BACKGROUND OF THE INVENTION

1. Field of the Invention

The present invention relates to a telephone and more particularly to the telephone having a separate power circuit for supplying power to a speech network.

2. Description of the Related Art

There has been known a conventional telephone, as shown in FIG. 1, connected to a telephone line 37. The telephone is connected to remote telephones through a network of exchanges. The conventional telephone includes a speech network 31, a handset 32, a dialer circuit 34, a dial 33, a ringer circuit 36, and a bell 35. The speech network 31 transmits voice signals to, and receives voice signals from, the telephone line 37. The handset 32 includes a speaker 39 and a microphone 38. The speaker 39 produces voice messages according to voice signals output from the speech network 31. The microphone 38 converts a voice into voice signals and inputs them to the speech network 31. The dialer circuit 34 converts input from the dial 33 into signals for dialing remote telephone. The ringer circuit 36 turns the bell 35 ON when a 16 Hz call signal is received from a telephone exchange through the telephone line 37.

Conventional telephones are driven by the current supplied from the telephone exchange via the telephone line 37, thus each circuit of the telephone, such as the speech network 31, the dialer circuit 34, and the ringer circuit 36, is directly connected to the telephone line. Because the current supplied from the telephone exchange fluctuates caused by changing telephone line connections, a special-purpose IC is used for the speech network 31 so as to be operable even under such an unstable condition. The characteristics of the speech network IC are determined by resistors and capacitors contained therein.

Resistors and capacitors used in the speech network in association with the speech network IC are recommended so as to meet the characteristics of the standard bell 35, dial 33 and handset 32.

However, in view of the fact that acoustic performances of individual handsets differ depending on the external shape of the handset 32 and characteristics of the microphone 38, the speaker 39 and the like. Therefore, for such telephones that employ nonstandard handset, satisfactory conversation conditions are not obtainable with the circuit of the speech network 31 configured by the recommended components.

Moreover, the use of the special-purpose speech network IC makes it difficult to configure the speech network circuit so as to have adequate characteristics of incoming transmission, outgoing transmission, and sidetone (the sound of the speaker's own voice as heard in his telephone receiver) and also impedance characteristic required for the speech network circuit under the fluctuating power supply condition. Consequently, the configuration of the speech network circuit has been difficult.

Using the special-purpose speech network IC in the speech network 31 has hindered attempts to reduce the cost of conventional telephones. Attempts have been made to use less expensive, general-purpose IC in its place, but these general-purpose ICs are unable to cope with fluctuations in current supply and the circuit configuration becomes far more difficult with the general-purpose IC.

SUMMARY OF THE INVENTION

The present invention has been made to overcome the above-described drawbacks, and it is therefore an object of the present invention to provide a telephone using a general-purpose IC in its speech network circuit in place of the conventionally used special-purpose speech network IC.

Another object of the present invention is to provide a telephone having a speech network circuit that can be readily configured using analog circuit components.

Still another object of the present invention is to provide a telephone having a speech network circuit that is simple in circuit arrangement and inexpensive in cost.

To achieve the above and other objects, there is provided according to one aspect of the present invention a telephone comprising sound converting means, transmitting means, receiving means, sound reproducing means, power supplying means, and interrupting means. The sound converting means converts audible sound into an outgoing audio signal. The transmitting means is connected between the sound converting means and a telephone line and transmits the outgoing audio signal to a remote telephone through a telephone line via a telephone exchange. The receiving means is connected to the telephone line and receives an incoming audio signal from the remote telephone through the telephone line. The sound reproducing means is connected to the receiving means and reproduces audible sound from the incoming audio signal. The power supplying means supplies power to at least the transmitting means and the receiving means and the interrupting means interrupts a power supply to the transmitting means and the receiving means from the telephone exchange through the telephone line.

According to another aspect of the invention, there is provided a telephone comprising sound converting means for converting audible sound into an outgoing audio signal, modulation/demodulation means, sound reproducing means connected to the modulation/demodulation means for reproducing audible sound from the demodulated incoming audio signal, means for supplying power to at least the modulation/demodulation means, and means for interrupting a power supply to the modulation/demodulation means from the telephone exchange through the telephone line. The modulation/demodulation means modulates the outgoing audio signal, produces a modulated outgoing audio signal, and transmits the modulated outgoing audio signal to a remote telephone through a telephone line via a telephone exchange. The modulation/demodulation means further receives a modulated incoming audio signal from the telephone line, demodulates the modulated incoming audio signal, and produces a demodulated incoming audio signal, wherein the modulation/demodulation means is configured by using at least one general-purpose integrated circuit.

According to still another aspect of the present invention, there is provided a telephone comprising a handset having a microphone for picking up audible sound and producing an outgoing audio signal and a speaker for reproducing audible sound from an incoming audio signal. A speech network is provided for transmitting the outgoing audio signal produced by the microphone to a remote telephone through a telephone line and for receiving the incoming audio signal from the remote telephone through the telephone line. A power supply is provided for supplying power to the speech network and a transformer is connected between the speech network and the telephone line for interrupting a power supply to the speech network from the telephone line.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENTS

A telephone according to a preferred embodiment of the present invention will be described while referring to FIGS. 2 and 3.

Figure 1:
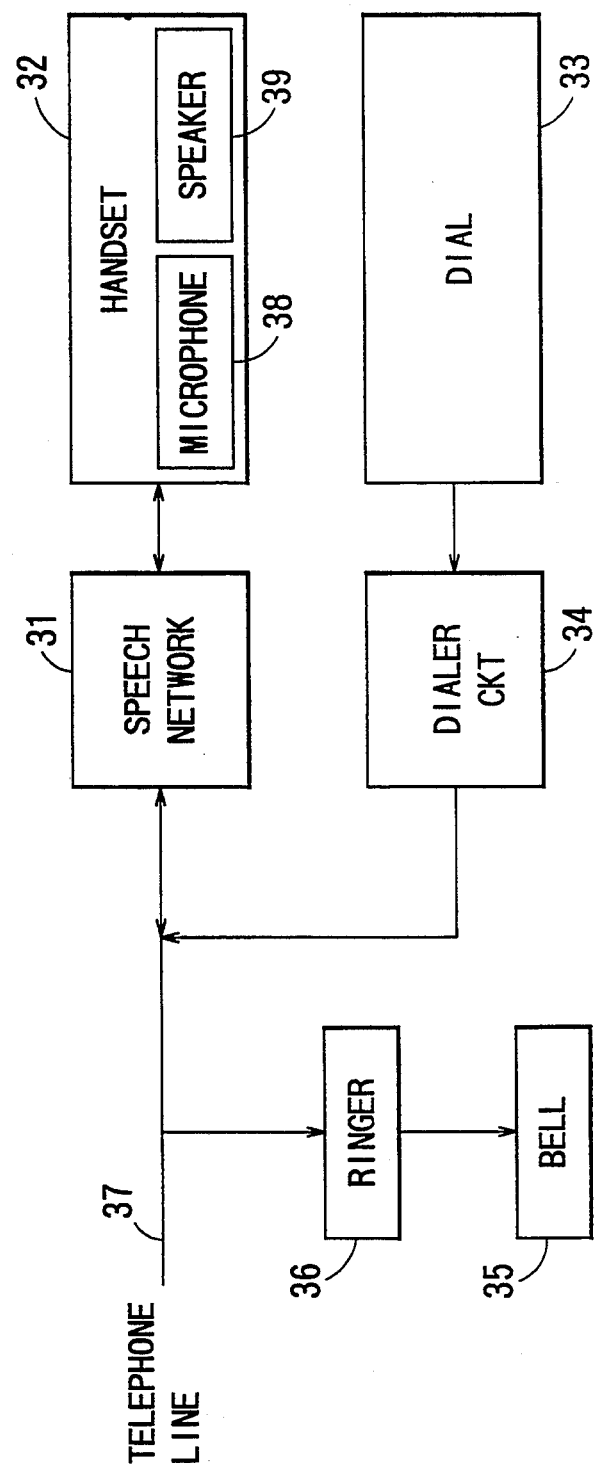
FIG. 1 is a block diagram showing an arrangement of a conventional telephone.
Figure 2:
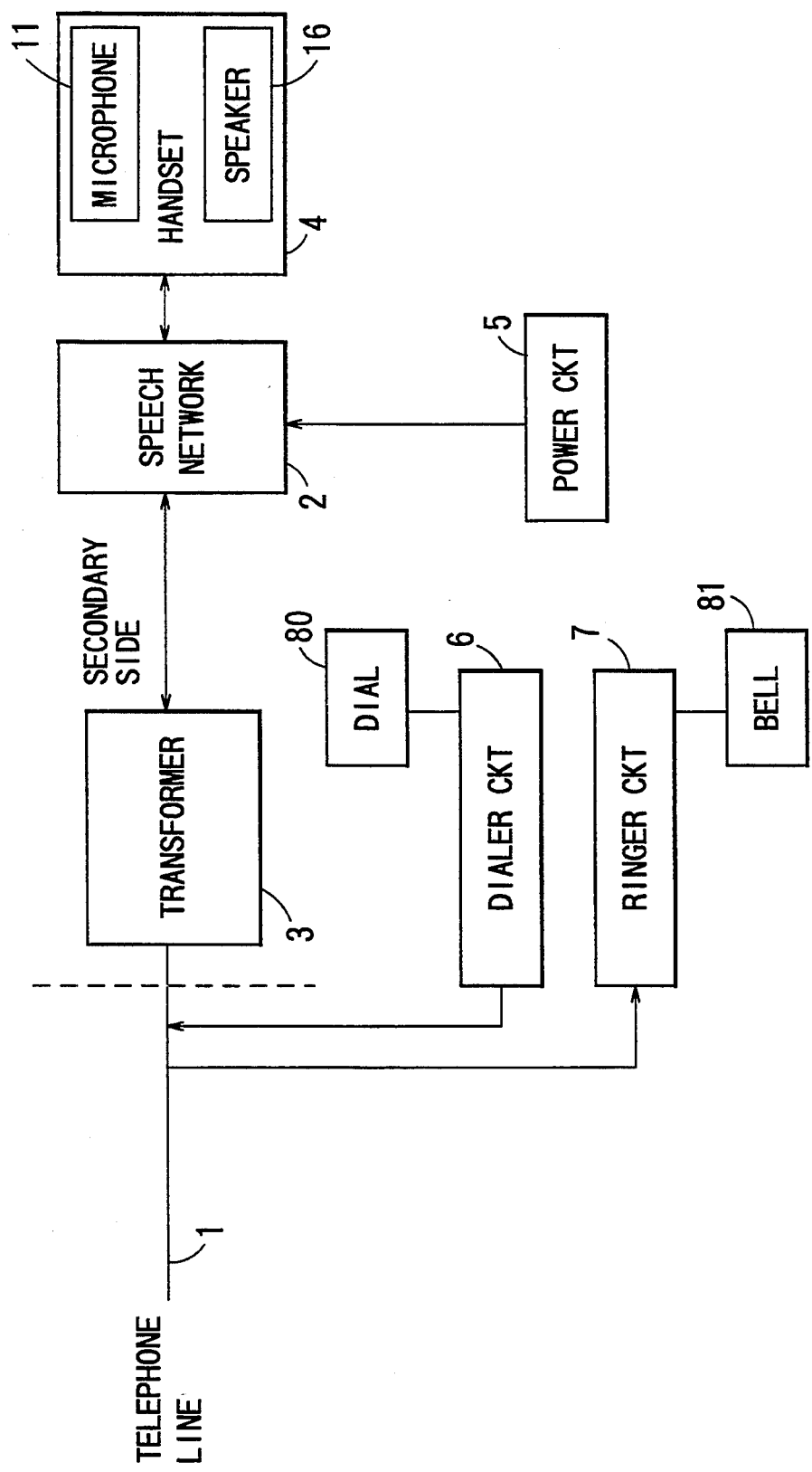
FIG. 2 is a block diagram showing an arrangement of a telephone according to a preferred embodiment of the present invention.

As shown in FIG. 2, the telephone in the preferred embodiment includes a handset 4, a speech network 2, a power circuit 5, a transformer 3, a dialer circuit 6, and a ringer circuit 7. A dial 80 is provided in association with the dialer circuit 6, and a bell 81 in association with the ringer circuit 7. The transformer 3 is interposed between a telephone line 1 and the speech network 2 to interrupt a d.c. power supply from a telephone exchange to the speech network 2 but to allow alternating current components to pass therethrough. The speech network 2 is supplied with a constant d.c. voltage from the power circuit 5. The power circuit 5 receives a commercial a.c. voltage and a rectifier contained therein rectifies the a.c. voltage to produce a d.c. voltage as is well known in the art. The handset 4 is connected to the speech network 2 and has a speaker 16 which reproduces a voice from a voice signal supplied from the speech network 2, and a microphone 11 which picks up and translates a voice to a voice signal to be supplied to the speech network 2.

The dialer circuit 6 and the ringer circuit 7 are connected to the telephone line 1 at the primary side of the transformer 3 so that these circuits are supplied with power from the telephone exchange through the telephone line 1. The dialer circuit 6 and the ringer circuit 7 could instead be connected to the secondary side of the transformer 3. However, little benefit would be derived from this connection in terms of a circuit design and circuit efficiency. On the contrary, to connect them to the secondary side would require a central processing unit made from, for example, a special microcomputer. The expense of such a processing unit would not be cost efficient. The dialer circuit 6 converts the input from the dial 80 into a call signal and sends the resultant signal to the telephone exchange. The ringer circuit 7 turns a bell 81 ON when a call signal is received.

The speech network 2 demodulates an incoming signal into a voice signal and modulates a voice signal into an outgoing signal. The speech network 2 employs a general-purpose IC, whereby the circuit design of the speech network 2 can be performed without considering fluctuations of the power voltage. Thus, the various characteristics of the speech network can be adequately established while taking unique features of the telephone into account.

Figure 3:
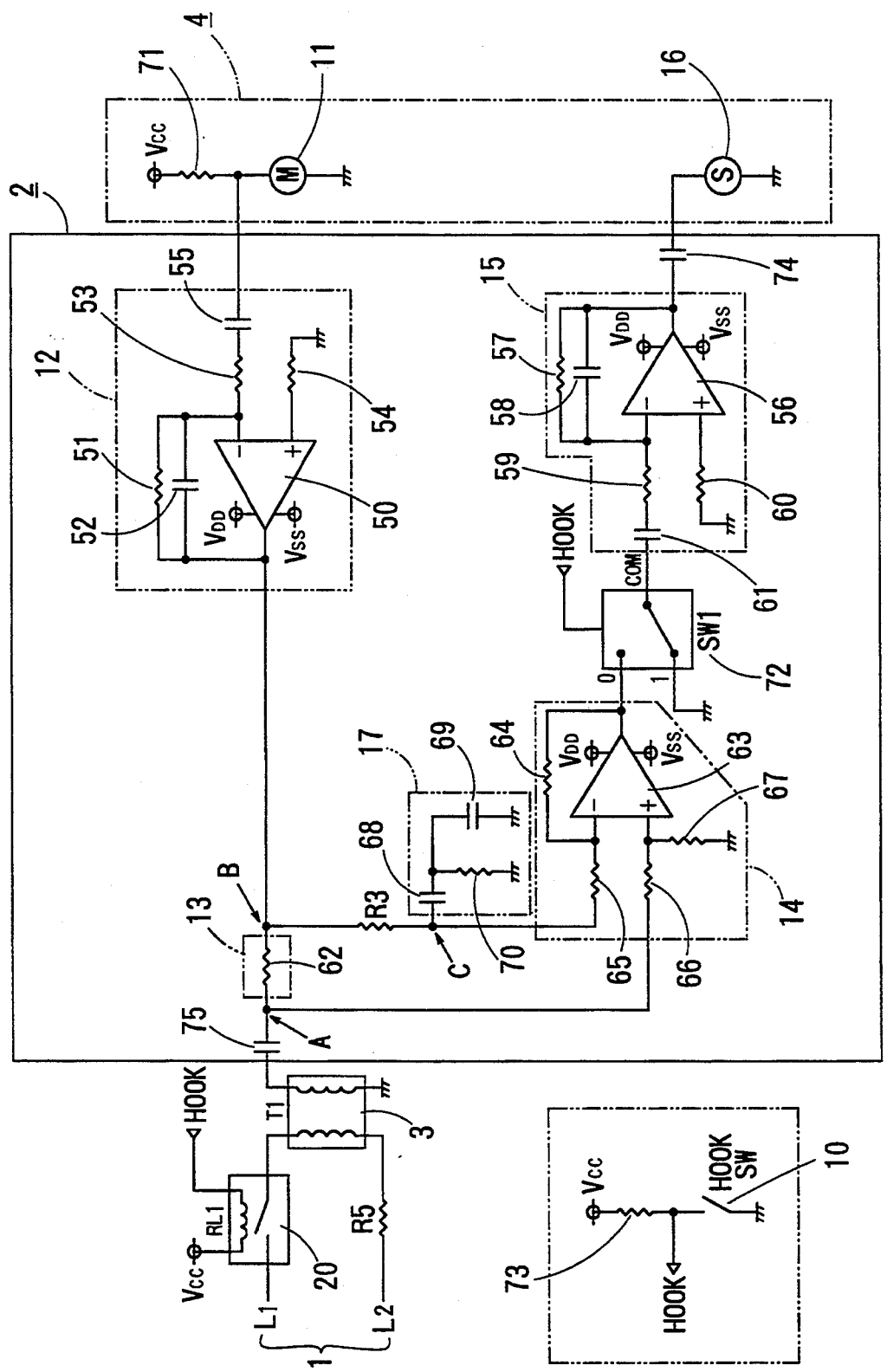
FIG. 3 is a circuit diagram of a speech network and a handset of the telephone according to the preferred embodiment of the present invention.

A specific circuit diagram of this embodiment is shown in FIG. 3. The speech network 2 generally includes a transmission circuitry and a reception circuitry. The transmission circuitry includes an transmission amplifier 12 and an impedance adjusting circuit 13. The reception circuitry includes a microphone signal cancellation circuit 14 and a reception amplifier 15 for amplifying the output from the microphone signal cancellation circuit 14.

The transmission amplifier 12 includes resistors 51, 53 and 54, capacitors 52 and 55, and an inverse amplifier (operation amplifier) 50. The voltages $V_{DD}$ and $V_{SS}$ supplied to the operational amplifier 50 are derived from the power circuit 5. The transmission amplifier 12 is connected at its input side to the microphone 11 from which it receives voice signals, and at its output side to both the impedance adjusting circuit 13 and a microphone signal adjusting circuit 17 (to be described later). The transmission amplifier 50 amplifies the voice signals and output signals with appropriate level and frequency characteristic.

The impedance adjusting circuit 13 includes a resistor 62 and is provided for complying with a requirement that an impedance of the speech network 2 as viewed from the telephone line be set to a predetermined level (typically 600Ω). This requirement can be substantially met if 600Ω resistor 62 is used because the output impedance of the transmission amplifier 12 is relatively low and the input impedance of the microphone signal cancellation circuit 14 is considerably high. One terminal B of the resistor 62 is connected, at one hand, to the transmission amplifier 12 and at the other hand, to one input of the microphone signal circuit 14 through the microphone signal cancellation adjusting circuit 17. The other terminal A of the resistor 62 is connected to the secondary coil of the transformer 3 via a capacitor 75.

The microphone signal adjusting circuit 17 includes capacitors 68 and 69, and resistor 70 and serves to adjust the signal at point B to agree with the signal developed at point A. That is, the signal appearing at point C is the same as that appeared at point A. Note that the level and the phase of the signal developed at point A are not equal to those of the output signal of the transmission amplifier 12 appearing at point B, because the impedances at points A and B as viewed from ground are not the same due to the inclusion of the resistor 62.

The microphone signal cancellation circuit 14 includes a differential amplifier 63 and resistors 64, 65, 66 and 67. Again, the voltages $V_{DD}$ and $V_{SS}$ supplied to the amplifier 63 are derived from the power circuit 5. One input terminal of the microphone signal cancellation circuit 14 is supplied with the signal output from the microphone signal adjusting circuit 17, which signal is substantially at the same level and the same phase as the signal at point A as described above. The other input terminal of the microphone signal cancellation circuit 14 is supplied with a composite signal of the outgoing signal and an incoming voice signal. By appropriately setting the resistances of the two input resistors 65 and 66 of the differential amplifier 63, the sidetone characteristics can be adjusted so that the voice signal from the microphone 11 appears at the speaker 16 at an appropriate volume.

The changeover switch 72 selectively connects or breaks connection between the output of the microphone signal cancellation circuit 14 and the input of the reception amplifier 15. The actions of the changeover switch 72 are interconnected with those of the relay 20 and the hook switch 10. That is, when the hook switch 10 is OFF, the relay 20 disconnects the loop connection of the telephone line, and the changeover switch 72 connects the signal input of the reception amplifier 15 to the ground so that the speaker does not produce any sound. When the hook switch 10 is turned ON, the relay closes the loop connection of the telephone line, and the wiper contact of the changeover switch 72 connects the output of the microphone signal cancellation circuit 14 with the signal input of the reception amplifier 15 so that generation of a voice signal is allowed.

The reception amplifier 15 includes an inverse amplifier (operation amplifier) 36, resistors 57, 59, and 60, and capacitors 58 and 61. The reception amplifier 15 receives voice signals outputted from the microphone signal cancellation circuit 14, amplifies and outputs them to the speaker 16 at appropriate level and frequency characteristic. The speaker 16 is driven by the amplified cancellation signal output by the reception amplifier 15.

When an incoming call is received from a remote telephone, the ringer circuit 7 detects the 16 Hz signal from the telephone line and rings the bell 81. When the user lifts the handset 4, the hook switch 10 turns ON, thereby energizing the relay 20 to connect the speech network 2 with the telephone line 1. The wiper contact of the changeover switch 10 is tripped over to contact "0", thereby connecting the signal input of the reception amplifier 15 with the output of the microphone signal cancellation circuit 14, thus allowing the voice signal of the incoming call to be amplified.

The transformer 3 allows only the alternating current component of the incoming voice signal to pass therethrough. After the incoming signal is adjusted by the microphone signal cancellation circuit 14 and the microphone signal adjusting circuit 17, it is transmitted via the changeover switch 72 to the reception amplifier 15, where it is amplified before being sent to the speaker 16.

The voice signal of the user is picked up by the microphone 11 and, after being amplified at the transmission amplifier 12, is transmitted to the telephone line 1. The voice signal detected by the microphone 11 also is sent to the reception amplifier 15. However, the level of the voice signal from the microphone is adjusted by the microphone signal cancellation circuit 14 to an appropriate volume.

To telephone a remote telephone, the user lifts the handset 4, thereby turning ON the hook switch 10. This drives the relay 20, closing the telephone circuit 1, and changes over the changeover switch 72, connecting the signal input of the reception amplifier 15 with the output of the microphone signal cancellation circuit 14, thus allowing the voice signal of the user to be amplified. The user dials a telephone number at the dial 80. A dial pulse or tone signal is accordingly sent to the telephone line 1 via the dialer circuit 6. Conversation is possible when connection with the circuit of the remote telephone is complete. Subsequent operations of the telephone are the same as when receiving an incoming call and so will not be repeated here.

As shown therein, the power circuit 5 is connected via terminals $V_{DD}$ and $V_{SS}$, to circuits of the speech network 2, including a transmission amplifier 12, a microphone signal cancellation circuit 14, and a reception amplifier 15, for providing power thereto. Microphone 11 receives power $V_{CC}$ from power circuit 5 via resistor 71.

While the invention has been described in detail with reference to specific embodiments thereof, it would be apparent to those skilled in the art that various changes and modifications may be made therein without departing from the spirit of the invention.

What is claimed is:

1. A telephone comprising:
   a handset;
   a hook switch cooperatively engaged with said handset, wherein a state of said hook switch is ON when said handset is disengaged from said hook switch and the state of said hook switch is OFF when said handset is engaged with said hook switch;
   sound converting means for converting audible sound into an outgoing audio signal;
   transmitting means, connected between said sound converting means and a telephone line, for transmitting the outgoing audio signal to a remote telephone through the telephone line via a telephone exchange;
   receiving means, connected to the telephone line, for receiving an incoming audio signal from the remote telephone through the telephone line;
   sound reproducing means, connected to said receiving means, for reproducing audible sound from the incoming audio signal;
   power supplying means for supplying non-line power to at least said transmitting means and said receiving means; and
   interrupting means for interrupting line-power to said transmitting means and said receiving means independently of the state of said hook switch, said line-power being received from the telephone exchange through the telephone line.

2. The telephone according to claim 1, wherein said interrupting means comprises a transformer having a primary coil and a secondary coil, and wherein the telephone line is connected to the primary coil of said transformer, and said transmitting means and said receiving means are connected to the secondary coil of said transformer.

3. The telephone according to claim 2, wherein said sound converting means is further connected to said power supplying means.

4. The telephone according to claim 2, wherein the handset comprises said sound converting means and said sound reproducing means, and said hook switch is interposed between the telephone line and the primary coil of said transformer.

5. The telephone according to claim 2, further comprising dialing means for producing a call signal to be transmitted to the telephone exchange to call the remote telephone, and said dialing means being connected to the primary coil of said transformer.

6. The telephone according to claim 5, further comprising ringing means for ringing when a call signal from the remote telephone is received through the telephone line, said ringing means being connected to the primary coil of said transformer.

7. A telephone comprising:
   sound converting means for converting audible sound into an outgoing audio signal;
   modulation/demodulation means for modulating the outgoing audio signal, for producing a modulated outgoing audio signal, for transmitting the modulated outgoing audio signal to a remote telephone through a telephone line via a telephone exchange, for receiving a modulated incoming audio signal from the telephone line, for demodulating the modulated incoming audio signal, and for producing a demodulated incoming audio signal, wherein said modulation/demodulation means comprises at least one general-purpose integrated circuit;

sound reproducing means, connected to said modulation/demodulation means, for reproducing audible sound from the demodulated incoming audio signal;

power supplying means for supplying non-line power to at least said modulation/demodulation means; and interrupting means for interrupting line-power to said modulation/demodulation means, said line-power supplied from the telephone exchange through the telephone line.

8. The telephone according to claim 7, further comprising:

a handset; and a hook switch cooperatively engaged with said handset, wherein a state of said hook switch is ON when said handset is disengaged from said hook switch and the state of said hook switch is OFF when said handset is engaged with said hook switch, and wherein said interrupting means interrupts the line-power to said modulation/demodulation means independently of the state of said hook switch.

9. The telephone according to claim 7, wherein said interrupting means comprises a transformer having a primary coil and a secondary coil, and wherein the telephone line is connected to the primary coil of said transformer, and said modulation/demodulation means is connected to the secondary coil of said transformer.

10. The telephone according to claim 9, wherein said sound converting means is further connected to said power supplying means.

11. The telephone according to claim 9, further comprising a handset, a hook receiving said handset, and a hook switch held open when said handset is placed on said hook and held closed when said handset is lifted from said hook, wherein the handset comprises said sound converting means and said sound reproducing means, and said hook switch is interposed between the telephone line and the primary coil of said transformer.

12. The telephone according to claim 9, further comprising dialing means for producing a call signal to be transmitted to the telephone exchange to call the remote telephone, and said dialing means being connected to the primary coil of said transformer.

13. The telephone according to claim 12, further comprising ringing means for ringing when a call signal from the remote telephone is received through the telephone line, said ringing means being connected to the primary coil of said transformer.

14. A telephone comprising:

a handset comprising a microphone picking up audible sound and producing an outgoing audio signal and a speaker reproducing audible sound from an incoming audio signal;

a hook switch cooperatively engaged with said handset, wherein a state of said hook switch is ON when said handset is disengaged from said hook switch and the state of said hook switch is OFF when said handset is engaged with said hook switch;

a speech network transmitting the outgoing audio signal produced by said microphone to a remote telephone through a telephone line and receiving the incoming audio signal from the remote telephone through the telephone line;

a power supply supplying non-line power to said speech network; and a transformer connected between said speech network and the telephone line interrupting line-power to said speech network independently of the state of said hook switch, the line-power being received from the telephone line.

15. The telephone according to claim 14, wherein said transformer has a primary coil connected to the telephone line and a secondary coil connected to said speech network.

16. The telephone according to claim 15, wherein said handset is powered by said power supply.

17. The telephone according to claim 15, wherein said hook switch is interposed between the telephone line and the primary coil.

18. The telephone according to claim 15, further comprising a dialer circuit producing a call signal to call the remote telephone, said dialer circuit being connected to the primary coil of said transformer.

19. The telephone according to claim 18, further comprising a ringer circuit ringing when the call signal is received through the telephone line, said ringer circuit being connected to the primary coil of said transformer.

* * * * *